United States Patent [19]

Graton et al.

[11] Patent Number: 5,064,041

[45] Date of Patent: Nov. 12, 1991

[54] AUTOMOTIVE FRICTION CLUTCH WITH TORSION DAMPING DEVICE

[75] Inventors: Michel Graton, Paris; Dieter Rohrle, Montmorency, both of France

[73] Assignee: Valeo, Paris, France

[21] Appl. No.: 370,830

[22] Filed: Jun. 23, 1989

[30] Foreign Application Priority Data

Jun. 30, 1988 [FR] France .................................. 88 08810
Dec. 2, 1988 [FR] France .................................. 88 15814

[51] Int. Cl.⁵ .............................................. F16D 3/14
[52] U.S. Cl. ............................... 192/106.2; 192/70.17; 464/68
[58] Field of Search ............... 192/106.1, 106.2, 70.17; 464/68

[56] References Cited

U.S. PATENT DOCUMENTS

| | | | |
|---|---|---|---|
| 2,636,363 | 4/1953 | Nutt | 192/106.2 X |
| 3,091,949 | 6/1963 | Sink | 192/106.2 X |
| 3,802,541 | 4/1974 | Schneider | 192/106.2 X |
| 4,190,142 | 2/1980 | Berlioux | 192/106.2 |
| 4,548,309 | 10/1985 | Braun | 192/106.2 |
| 4,596,535 | 6/1986 | Ooga | 464/68 |
| 4,613,029 | 9/1986 | Beccaris | 464/68 |
| 4,634,398 | 1/1987 | Alas | 464/68 |
| 4,669,592 | 6/1987 | Alas et al. | 192/106.2 |
| 4,685,896 | 8/1987 | Carmillet et al. | 464/68 |

FOREIGN PATENT DOCUMENTS

| | | | |
|---|---|---|---|
| 1504222 | 10/1967 | France. | |
| 2560328 | 2/1984 | France | 192/106.2 |
| 2560954 | 9/1985 | France | 464/68 |
| 0172099 | 2/1986 | France | 464/68 |
| 0057924 | 4/1982 | Japan | 192/106.2 |

Primary Examiner—Leslie A. Braun
Assistant Examiner—Andrea Pitts
Attorney, Agent, or Firm—Charles A. Brown

[57] ABSTRACT

A torsion damping device has a pair of guide rings, a damper plate and a hub. Resilient are confined between the two guide rings, and arranged on either side of the damper plate so as to bear on the damper plate or the hub in such a way as to exert a biassing and gripping force thereon. There is a radial clearance between the hub and whichever one of the two coaxial parts of the damper is freely mounted with respect to the hub, in such a way that the hub is floatingly mounted with respect to that coaxial part.

4 Claims, 3 Drawing Sheets

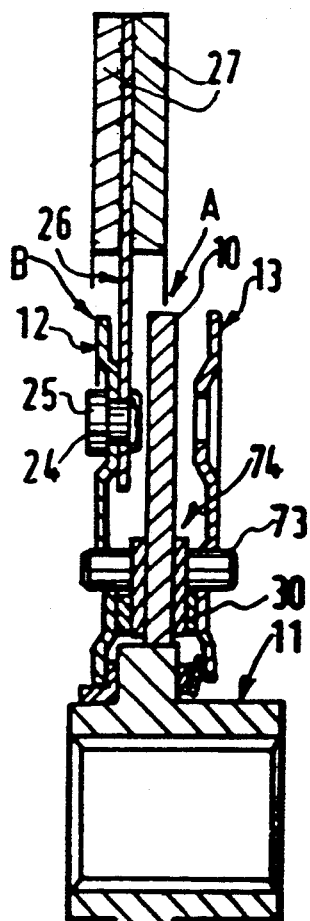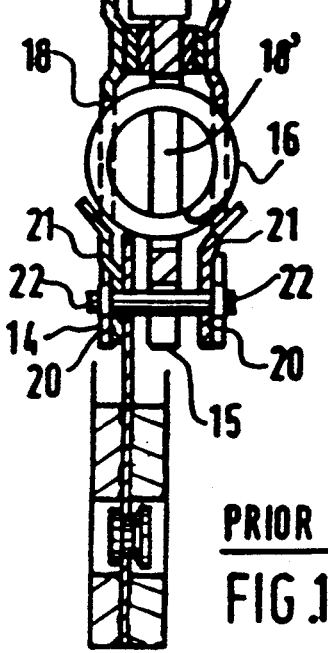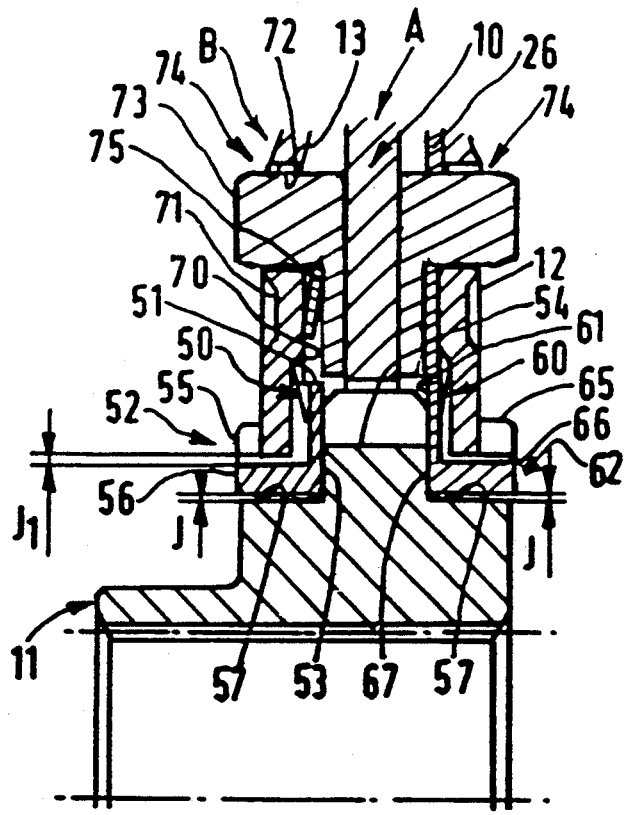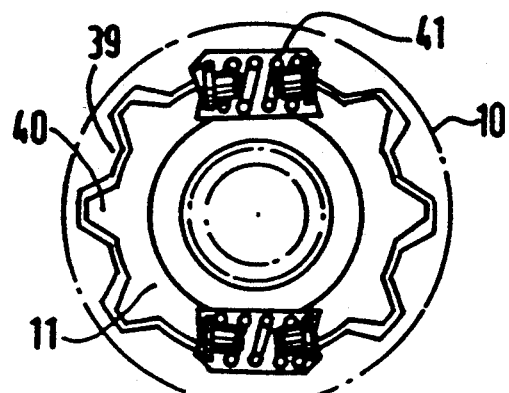
PRIOR ART
FIG.1
PRIOR ART
FIG.2
FIG.3

AUTOMOTIVE FRICTION CLUTCH WITH TORSION DAMPING DEVICE

FIELD OF THE INVENTION

This invention relates to a torsion damping device, particularly for a disc type friction clutch for automotive vehicles, the device being of the kind comprising two coaxial parts, one of which is a driving part for coupling to a driving shaft so as to be driven thereby, the other of said parts being a driven part adapted to be coupled with a driven shaft so that the latter rotates with the driven part of the clutch, the said driving and driven shafts being arranged for relative rotation of one with respect to the other, within the limits of a predetermined range or sector of relative angular displacement and against the action of resilient coupling means coupling the two coaxial parts together, and further against the action of friction means, one of the two said coaxial parts including a damper plate and the other comprising two wheels or discs of the kind commonly called guide rings, the guide rings being arranged respectively on either side of the damper plate.

BACKGROUND OF THE INVENTION

Such a device is described in U.S. Pat. No. 4,669,592 and the corresponding French patent publication FR 2 560 328A, in which the damper plate is moveable with respect to a hub within the limits of a said range of relative angular displacement, while the hub is adapted to be secured to the primary shaft of the gearbox for rotation therewith. One of the guide rings is freely mounted with respect to the hub and carries a support member fitted with the clutch friction pads which couple the primary shaft of the gearbox to the crankshaft of the vehicle. The damper plate can of course be fixed to the hub. A bearing of L-shaped cross section is also provided. This bearing has an axially extending element and a radially extending element, and is interposed between the hub and one of the guide rings.

In that type of damper, the driven shaft may not be perfectly aligned with the driving shaft, but can become radially offset and inclined at an angle with respect to it. In operation, this results in axial and radial forces occurring within the friction disc clutch. This is aggravated by the fact that manufacturers tend to omit the bearing mounted at the end of the crankshaft and carrying the end of the driven shaft, so that the latter is mounted out of true, which further accentuates the axial and radial forces mentioned above.

In order to overcome this disadvantage, it could be proposed that the axial portion of the bearing might be made radially resilient, but such an arrangement may prove insufficient in the case where the shafts are inclined at an angle with respect to each other, since it will not allow the axial forces to be minimised as is desirable, and as is indeed required because of the presence of the radial element of the bearing which constitutes a spacer between the guide ring concerned and the hub. This solution is also difficult to apply in practice when the guide rings are fixed to the hub, with the damper plate freely mounted with respect to the hub.

SUMMARY OF THE INVENTION

An object of the present invention is to overcome the above disadvantages and thus to provide a device which allows the axial and/or radial forces set up within the damping device to be reduced, while still preserving ease of manufacture and also obtaining other advantages.

According to the invention, a device of the kind described above is characterised in that it is provided with at least two axially acting resilient means which are confined between the two guide rings and arranged on either side of the damper plate, with each said axially acting resilient means bearing upon one of the guide rings so as to exert a biassing force on the damper plate or the hub and to grip the latter, the device being further characterised in that there is a radial clearance between the hub and that one of the two said coaxial parts of the device.

The invention enables the flexibility of the hub and/or of the damper plate with respect to the guide rings to allow better adaptation to faulty positioning of the driving shaft with respect to the driven shaft, and thus results in a reduction in the axial and/or radial forces that would otherwise be set up within the damping device. The risk of seizing up is also reduced or eliminated. It will be noted that the device according to the invention is in apparent contradiction with conventional thinking, according to which it was regarded as necessary to eliminate all clearances between the hub and the coaxial part (either with guide rings or with damper plate) that is mounted freely with respect to the hub.

It will also be appreciated that when the resilient means in an assembly according to the invention act on friction rings, the force exerted on the friction rings varies less with wear, because each of these resilient means is lengthened by a smaller amount than in the case where only a single resilient means is provided. This is particularly true when the resilient means consists of Belleville rings.

With a friction disc clutch, the independent movement of the hub with respect to the friction disc support member improves the freedom of the friction pads with respect to the pressure and reaction plates of the clutch during operation of the clutch, even if the ability of the hub to slide with respect to the driven shaft is reduced over a period of time, for example due to the effects of corrosion. In addition, rotational flexing of the support member is minimised, and the means by which it is secured is subjected to reduced forces.

In the case where circumferentially acting resilient means of low stiffness are interposed between the damper plate and the hub, the invention results in elimination of the risk that the action of these resilient means might be nullified due to some parasitic frictional or jamming effect. This improves comfort generally.

In a modification, the bearing has a bearing surface which is generally conical in shape, for cooperation with a complementary bearing surface formed, for cooperation therewith, on the outer periphery of the hub. The portion of the bearing which carries the conical bearing surface is mounted with a radial clearance between it and the adjacent guide ring. Thus, the clearances between the relevant guide ring and the hub are reduced, as are the out of balance effects, but without prejudice to the advantages of the floating mounting of the hub itself. When two bearings are provided, only one of them has the conical bearing surface, the other being mounted with a radial clearance with respect to the hub.

It will be appreciated that the radially extending element of the bearing may have a reduced radial length.

The following description illustrates the invention, by way of example only, with reference to the accompanying drawings.

BRIEF DESCRIPTION OF THE DRAWINGS

FIG. 1 is a view in axial cross section of a friction type disc clutch of the same type as that described in U.S. Pat. No. 4,669,592 and the corresponding French published patent document FR 2 560 328A.

FIG. 2 is a diagrammatic view of the loose coupling means provided between the hub and the damper plate.

FIG. 3 is a view in partial axial cross section of a disc clutch according to the invention.

DESCRIPTION OF PREFERRED EMBODIMENTS

Figure 4:
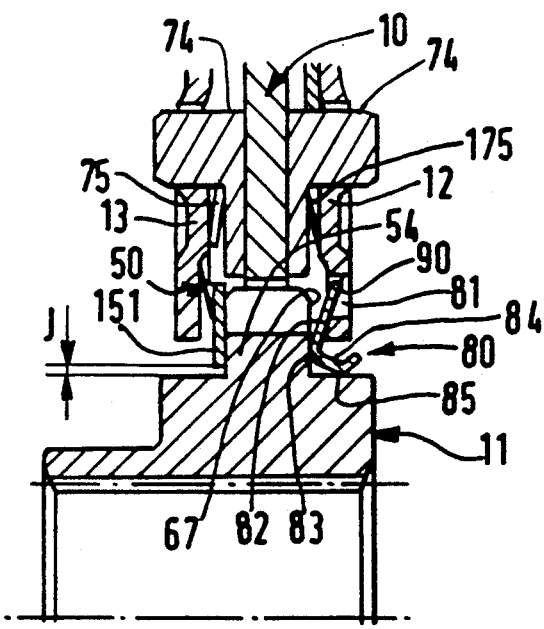
FIGS. 4 to 7 are views similar to FIG. 3, but show other embodiments.

In FIG. 1, a conventional disc type clutch is shown, comprising one part A and part B, which are mounted coaxially and rotatably with respect to each other. The part A includes a damper plate 10, which is associated with a hub 11 adapted to be mounted on the primary driven shaft (not shown) of the gearbox of the automotive vehicle. The part B includes two identical guide rings 12 and 13, which are arranged on either side of the central damper plate 10 and which are coupled with each other through spacers 14 which extend through openings 15 formed peripherally in the damper plate 10. Circumferentially acting resilient means 16, which couple the guide rings 12 and 13 to the damper plate 10, consist in this example of coil springs. The springs 16 are mounted partly in openings 18 in the guide rings 12 and 13 and partly in openings 18' in the damper plate 10, being mounted without clearance in the openings 18 and with clearance in the openings 18'.

Each guide ring 12, 13 has U-shaped, peripheral, pressed portions 20, each of which has a rectangular hole 22 for mounting a flat spacer 14 therein. In this example, the guide ring 12 includes generally circular pressed portions, each of which has a hole 24 for securing it, for example by means of a rivet 25, to a support plate 26 carrying the friction pads 27 of the clutch.

The support plate 26 is adapted to be coupled, for rotation when the clutch is engaged, with a driving shaft constituted by the crankshaft of the engine of the vehicle. This coupling is obtained by gripping the friction pad 17 between the pressure plate and reaction plate (not shown) of the clutch.

The damper plate 10 and the hub 11 are mounted with a circumferential clearance which is defined between sets of teeth 39 and 40 (FIG. 2) formed respectively in the plate 10 and in the hub 11. The teeth 39 and 40 are trapezoidal in shape, with the teeth 39 meshing, with a clearance, in the grooves defined between the teeth 40, and vice versa. In addition, there is a radial clearance between the hub 11 and the damper plate 10. Thus, the hub 11 can mesh with the damper plate 10 with a clearance. Circumferentially acting resilient means of low stiffness, consisting of springs 41 in this example, are mounted generally at the same radius as the teeth 39 and 40. The guide rings 12 and 13 are freely mounted around the hub 11.

In accordance with the invention, at least two axially acting resilient means 50, 60 are confined between the guide rings 12 and 13, being arranged on either side of the damper plate 10 so as to exert a biassing action on the damper plate or the hub and to grip the latter. A radial clearance exists between the hub 11 and that one of the coaxial parts A, B of the damper which is freely mounted with respect to the hub 11, in such a way that the hub can float with respect to that coaxial part. More precisely, each of the resilient means 50, 60 bears directly or indirectly, for example through a ring, on one of the guide rings 12 and 13 so as to exert a biassing force on the damper plate 10 or the hub 11, acting either directly or indirectly on the damper plate or on the hub.

In FIG. 3, the resilient element 50 comprises a Belleville ring, which bears directly on the guide ring 13, and which urges the radial ring element 51 of an annular bearing 52 of L-shaped cross section into contact with a shoulder 53, which is defined by a flange 54 in which teeth 40 are formed. The flange 54 extends radially around the outer periphery of the hub 11, and is formed integrally with the latter. The teeth 39 are formed on the inner periphery of the damper plate 10. The bearing 52 has half-moon shaped projections 55 which extend into complementary recesses formed in the guide ring 13 to couple the bearing with the guide ring for simultaneous rotation. In a modification, the ring element 51 may have pins sliding in complementary openings formed in the guide ring 13, in order to couple the bearing and guide ring together.

The guide ring 13 is mounted with respect to the hub 11 with a radial clearance, an axial element 56 of the bearing 52 being interposed radially between them. A radial clearance J exists between an internal recess of the axial bearing element 56, the latter being a bearing ring cooperating with an axially orientated bearing surface 57 formed on the outer periphery of the hub 11. The projections 55 are formed on the element 56, which is mounted with a radial clearance J1, greater than the clearance J, with respect to the inner periphery of the ring 13.

In a manner generally symmetrical with the above, the corresponding resilient means 60 is a Belleville ring which bears on the guide ring 12 and urges a bearing 62, identical to the bearing 52, axially into contact, through its radial ring element 61, with the other face 67 of the flange 54, while a radial clearance J exists between the internal recess of the axial element 66 of the bearing 62 and an outer bearing surface 57 of the hub 11. Since the guide rings 12 and 13 are identical, the element 66 of the bearing 62 has projections 65 which couple this bearing with the guide ring 12 for rotation therewith. As before, a radial clearance J1 exists between the inner periphery of the ring 12 and the outer periphery of the bearing element 66.

The bearings 52 and 62 do not of course have to be identical: the bearing 62 may simply comprise a ring 61 mounted with a clearance with respect to the bearing surface 57.

The resilient rings 50 and 60 are each centered by means of a detent 70, formed in each guide ring 12 and 13 so as to define a portion 71 which is axially offset towards the damper plate 10. Openings 72 are formed in the offset portion 71. Pins 73, fixed to a friction ring 74, extend through the openings 72 so that the friction ring 74 is thus coupled for rotation with the guide ring 13. A similar friction ring 74 is coupled in exactly the same way with the guide ring 12.

These arrangements are similar to those seen in FIG. 1, except that the support plate 26 extends radially inwards as far as the inner periphery of the guide ring 12. A Belleville ring 75 bears on the guide ring 12 and urges the friction ring 74 towards the damper plate 10, so that the other friction ring 74 is gripped between the damper plate 10 and the support plate 26. It will be noted that the Belleville ring 75 and friction ring 74 extend radially outside the rings 50 and 60, and that the Belleville ring 75 is inclined in the opposite direction with respect to the ring 50 and develops a greater applied force than does the latter. The Belleville rings 50 and 60 may exert the same or different forces.

In operation, as long as the clearance between the teeth 39 and 40 is not taken up, the hub 11 can be displaced circumferentially with respect to the guide rings 12 and 13 and with respect to the damper plate 10, against the action of the springs 41, with the guide rings 12 and 13 being fixed with respect to the damper plate 10 through the springs 16, the latter having greater stiffness than the springs 41, adapted to eliminate dead centre noise. During this phase of operation, the hub 11 is floating while being gripped, and can be displaced both rotationally and radially with respect to the guide rings 12 and 13 and damper plate 10, by virtue of the resilient means and the different clearances J and J1. In this connection, the clearance J1 allows the radial bearing ring elements 51 and 61 to lie flat against, respectively, the faces 53 and 67.

After the clearance between the teeth 39 and 40 has been taken up, the damper plate 10 is centred with respect to the hub 11, by virtue of the trapezoidal shape of the teeth 39 and 40, and the springs 16 are compressed with the intervention of the friction rings 74.

Reference is now made to FIG. 4. Here, the damper plate 10 can be mounted floatingly with respect to the guide rings 12 and 13 by virtue of further resilient means 75, 175 disposed concentrically and radially outside the resilient means associated with the flange 54. These further resilient means consist of two identical Belleville rings 175, 75. The ring 175 is interposed between the guide ring 12 and the corresponding friction ring 74. In a modification, not shown, the ring 175 may be interposed between the support plate 26 and the friction ring 74 associated with the guide ring 12. In another modification, the guide rings 75 and 175 may not be identical but may exert different forces.

The bearing associated with the Belleville ring 50 is reduced in FIG. 4 to a simple ring 151, which is mounted with a radial clearance J around the bearing surface 57 of the hub. The resilient means associated with the guide ring 12 and the hub 11 comprises an axially and radially resilient ring 80. This ring 80 bears directly on the guide ring 12, and has tabs 81 engaged in openings 90 formed in the guide ring 12 so as to couple it with the latter for rotation with it. The tabs 81 project from a continuous inclined portion 82, which is provided with a curved end 83 for direct contact with the face 67 of the hub 11. The curved end portion 83 is extended by tabs 84, which are inclined in the opposite direction from the inclined portion 82. The tabs 84 terminate in curved portions 85 which are in contact with the hub bearing surface 57. In a modification, the tabs 84 may be replaced by a ring.

Figure 5:
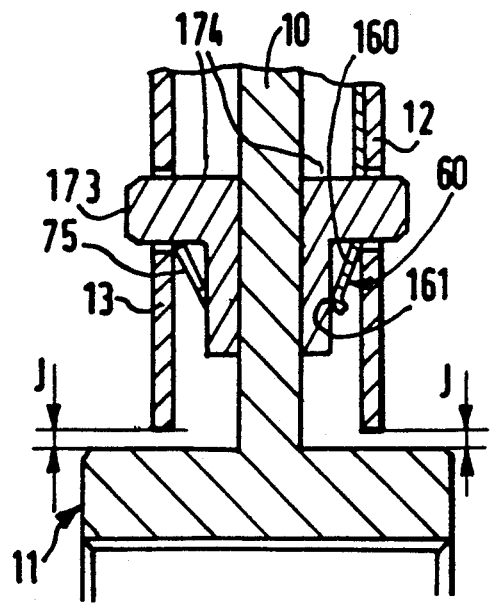

Referring now to FIG. 5, in this embodiment the damper plate 10 is fixed, at least in the rotational sense, with respect to the hub 11, and may for example be formed integrally with the latter. In this embodiment, the resilient means associated with the guide ring 12 is an integral part of the support plate 26, with the latter having resilient projections 160. The friction rings are here denoted by the reference numeral 174, and their pins, 173, extend between the resilient projections 160. The latter are inclined axially with respect to the main part of the support plate 26, and are preferably curved, as indicated at 161, where they bear on the ring 174. These projections 160 can of course be replaced simply by a continuous ring having openings through which the pins 173 pass.

Figure 6:
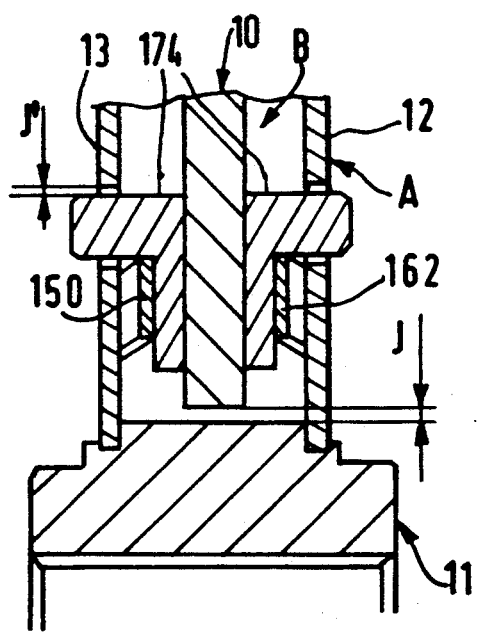

In another embodiment, shown in FIG. 6, the guide rings 12 and 13 are fixed in rotation with respect to the hub 11, for example by being inset into it as shown, while the damper plate 10 is freely mounted around the hub 11 to define a radial clearance between them, and with the damper plate 10 carrying the support plate 26. In this example, rings 162, 150 of the axially corrugated type known as "Onduflex" are used. The rings 12 and 13 here form part of the coaxial part A, with the damper plate 10 being in the part B.

As will be clear from the above description, the radial clearance J should not be too large, in order to minimise imbalance effects.

Figure 7:
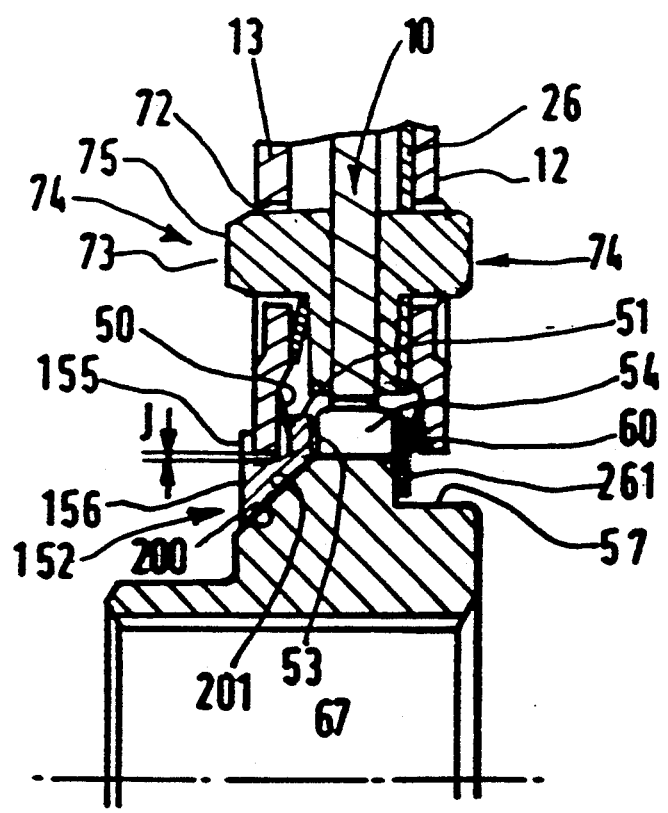

In the further embodiment shown in FIG. 7, the bearing, here denoted by the reference numeral 152, has a generally conical surface 200 for cooperation with a complementary surface 201, also generally conical, formed on the outer periphery of the hub 11. There is a radial clearance between the guide ring 13 and the bearing 152, with the latter being interposed radially between the surface 201 of the hub 11 and the inner periphery of the guide ring 13. The hub bearing surface 201 joins the flange 54 at the inner circumference of the latter, and extends in the direction of the axis of the assembly, while the surface 200 comprises the inner periphery of the bearing 152. This bearing surface 200 is formed in the internal cavity of the axial element 156 of the bearing 152, the element 156 being in the form of a crown carrying the projections, 155 in FIG. 7. The element 156 is radially disposed between the inner periphery of the guide ring 13 and the hub bearing surface 201. The bearing 152 is thus mounted on the surface 201 without clearance, while a radial clearance J exists between the outer periphery of the bearing element 156 and the guide ring 13. It will be noted that there is also an axial clearance between the shoulder 53 of the flange 54 and the radial element 51 of the bearing 152.

Similarly, the resilient means 60 is a Belleville ring which bears on the guide ring 12 and urges a ring 261 axially into contact with the other face 67 of the flange 54. This ring 261 is preferably mounted with a clearance between it and the surface 57 of the hub 11. It will be noted that the different clearances allow the bearing 52 and the ring 261 to remain flat against, respectively, the surface 201 and the face 67.

After the clearance between the teeth of the damper plate 10 and the hub 11 has been taken up, the damper plate 10 is centred with respect to the hub 11. It will be appreciated that the bearing 52 allows the hub 11 to rotate perfectly freely during the first phase, while reducing the radial clearances between the guide ring 13 and the hub 11. It will also be noted that the axial clearance between the flange 54 and the radial element 51 of the bearing may be reduced or even eliminated due to wear.

The present invention is of course not limited to the embodiments described. In particular, the damper plate or the guide rings may be fixed on the engine flywheel, with the torsion damping arrangement arranged on the driving side and being coupled in rotation to the input shaft of a transmission unit comprising the gearbox and containing a separate clutch.

Similarly, the resilient means may be made integral with the rings 51, 61 or 174, preferably in plastics material.

The resilient means, for example in FIG. 4, may of course bear on the damper plate 10, and be arranged to urge the friction rings 174 towards the guide rings, with the friction rings 174 then being fixed with respect to the damper plate 10 for rotation with it. In this case, all that is necessary is to reverse the pins 173.

In place of a single Belleville ring 50, 60, 75 or 175, a pair of Belleville rings arranged in a V-shape may be used in order to obtain a better distribution of the forces acting on the friction rings, with the Belleville rings being in contact respectively with the inner and outer peripheries of the friction rings.

Features of the various embodiments described above may be combined with each other. For example, a resilient means of one of the types described may be associated with a resilient means of another type. A similar consideration applies to the friction means, so that for example a bearing 52 may be associated with a friction ring 74. Also, a protective ring or washer may be inserted between any of the axially acting resilient means and a component on which it bears, while in FIG. 5 the hub may be provided with a flange as in the other embodiments described.

As will be understood from the foregoing, in all cases, coupling of the friction means with the guide rings 12 and 13 or the damper plate 10, for simultaneous rotation, may be achieved using a clearance as at J' in FIG. 6 and J1 in FIG. 3, according to the application to which the assembly is to be put, it being understood that the friction means should have as large a contact surface with the component with which it cooperates as possible.

What is claimed is:

1. A torsion damping device for association with a friction clutch and comprising driving part, a driven part, first resilient means and friction means for coupling said driving part with said driven part, mounting means mounting said driving part and driven part together and defining a predetermined sector of relative angular displacement of one of said parts with respect to the other, whereby said parts are coaxial and relatively rotatable within the limits of said sector and against the action of said first resilient means and friction means, one of said parts comprising a damper plate, the other of said parts comprising two guide rings, said guide rings being arranged on either side of the damper plate, the driven part further comprising a hub, means for mounting either the guide rings or the damper plate freely with respect to the hub, at least two axially acting second resilient means confined between the guide rings and disposed on either side respectively of the damper plate, wherein each said second resilient means bears on a respective one of the guide rings whereby to exert a biassing force on the damper plate or the hub and a gripping force on the latter, and means defining a radial clearance between the hub and said one of said coaxial parts of the torsion damping device which is freely mounted with respect to the hub, whereby the hub is mounted floatingly with respect to said one of said coaxial part, said device having means mounting the guide rings freely with respect to the hub and means mounting the damper plate with respect to the hub and defining a circumferential and radial clearance therebetween, each said second resilient means bearing directly or indirectly on the corresponding guide ring and acting directly or indirectly on the hub, the hub having a radial flange against which the second resilient means so bear, and means defining a radial clearance between the guide rings and the hub.

2. A device according to claim 1, wherein said defice further comprises third resilient means disposed radially outwardly of the second resilient means associated with said flange of the hub, said third resilient means comprises, between each guide ring and the damper plate, a resilient element bearing directly or indirectly on the appropriate guide ring and acting directly or indirectly on the damper plate.

3. A device according to claim 1, wherein said device further comprises a bearing having a generally conical bearing surface, the hub has a complementary bearing surface on its outer periphery, said bearing is mounted on the hub through its generally conical bearing surface and said bearing surface of the hub, one of said second resilient means is in engagement on the hub through said bearing, the bearing defines a radial clearance between itself and the associated said guide ring.

4. A device according to claim 3, wherein said bearing has a radial element, said radial bearing element and said flange of the hub define an axial clearance between them.

* * * * *